United States Patent Office 3,449,358
Patented June 10, 1969

3,449,358
4-DIFLUORAMINO-5-ALKOXY-2-NITRIMINOIMIDAZOLIDINES
Andrew Harper Dinwoodie, Dalry, and James McAllan Cormack Thompson, Seamill, Scotland, assignors, by mesne assignments, to the United States of America as represented by the Secretary of the Navy
No Drawing. Filed Jan. 10, 1967, Ser. No. 613,065
Claims priority, application Great Britain, Feb. 28, 1966, 8,764/66
Int. Cl. C07d 49/34; C06b 15/02
U.S. Cl. 260—309.7      9 Claims

ABSTRACT OF THE DISCLOSURE

New compounds which are 4-difluoramino-5-methoxy- and 5-ethoxy-2-nitriminoimidazolidines. The new compounds are explosive and energetic constituents of propellant compositions. They are prepared by a process in which the corresponding 4,5-dialkoxy-2-nitriminoimidazolidine is reacted with fluoroamine in an inert atmosphere in the presence of strong sulphuric acid. When the sulphuric acid is 96% strength, aqueous formaldehyde is also used.

---

This invention relates to new compounds which are difluoraminated derivatives of alkoxy-substituted 2-nitriminoimidazolidines, and to their preparation. The new compounds are explosive and are valuable energetic constituents of propellent compositions.

The most readily prepared derivatives appear to be monodifluoraminated, conforming to the structural formula shown as (1) below. Especially valuable and readily prepared compounds of the invention are 4-difluoramino-5-methoxy-2-nitriminoimidazolidine and 4-difluoramino-5-ethoxy-2-nitriminoimidazolidine.

In accordance with the invention, a difluoraminated derivative of alkoxy-substituted 2-nitriminoimidazolidine is prepared by reacting 4,5-dialkoxy-2-nitriminoimidazolidine with difluoramine in an inert atmosphere in the presence of an acidic condensing agent. The term "inert atmosphere" is used herein to denote an atmosphere substantially free from any constituent, such as oxygen, which reacts with difluoramine.

The reaction for the preparation of the monodifluoraminated compounds may be represented as:

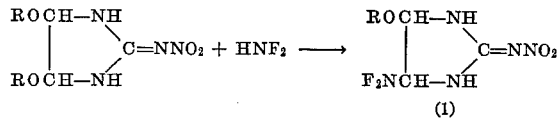

where R represents an alkyl group.

The starting material, 4,5-dialkoxy-2-nitriminoimidazolidine, may be prepared as described in our co-pending application Ser. No. 600,381, filed Dec. 9, 1966.

The preferred acidic condensing agent is strong (80–96%) sulphuric acid which is preferably used in the presence of aqueous formaldehyde. The use of 96% sulphuric acid alone gives rise to decomposition.

The reaction may conveniently be carried out either under autogenous pressure at room temperature, or under atmospheric pressure at a reduced temperature. A convenient procedure is to carry out the reaction under conditions of difluoramine reflux at atmospheric pressure, i.e. at about −23° C.

The invention is further illustrated by the following examples in which all parts and percentages are by weight.

Example 1

4 parts of difluoramine were refluxed at atmospheric pressure for 2 hours in a nitrogen atmosphere on to 0.53 part of 4,5-dimethoxy-2-nitriminoimidazolidine. 9 parts of 80% aqueous sulphuric acid were added dropwise and difluoramine reflux continued for a further 4 hours. The reaction mixture was allowed to warm up to room temperature and excess difluoramine was removed in a stream of nitrogen. The reaction mixture was then poured onto 50 parts of ice and extracted with diethyl ether. Evaporation of the ether after drying the solution gave 0.06 part (10% of theory) of a white crystalline solid, melting at 152° C., which was identified as 4-difluoramino-5-methoxy-2-nitriminoimidazolidine. Elemental analysis of the solid showed it to contain 23.4% carbon, 3.2% hydrogen, 16.5% fluorine and 33.9% nitrogen. 4-difluoramino-5-methoxy-2-nitriminoimidazolidine, $C_4H_7F_2N_5O_3$, requires 22.8% carbon, 3.3% hydrogen, 17.9% fluorine, and 33.2% nitrogen.

The infra-red spectrum of the product showed strong absorptions at 2.95 and 3.1μ, attributable to NH, at 6.2μ, attributable to −N.NO₂, at 10.4μ, attributable to NF₂ and also at 6.6, 7.8–7.9, 8.15, 9.35μ. Weaker absorptions were also shown at 11.3 and 12.1–12.2μ, attributable to NF, and also at 8.9, 9.1 and 12.85μ. The proton magnetic resonance at 60 megacycles/second of the product in acetone solution, using tetramethylsilane as internal reference, showed a single peak at 6.46ζ, a complex group of 12 peaks in the region 5.5 to 4.0ζ, and two peaks at 1.22 and 0.73ζ, these three sets of peaks being in the ratio 3:2:2. Deuteration of the solution removed the peaks at 1.22 and 0.73ζ indicating that they arise from the hydrogen nuclei on the nitrogen atoms. The peak at 6.46ζ was in the region associated with the hydrogen nuclei of a methoxy group, and the complex group of 12 peaks in the region 5.5 to 4.0ζ is consistent with the spectrum of two magnetically non-equivalent hydrogen nuclei attached to the carbon atoms of the imidazolidine ring. The 19F nuclear magnetic resonance spectrum at 56.458 megacycles/second of the compound in acetone solution, using trichlorofluoromethane as internal standard, showed two doublets, centred at −41.7δ (J=19 c./sec.) and −38.8δ (J=27 c./sec.) in the region associated with the fluorine nuclei of difluoramino groups.

Example 2

0.54 part of 4,5-dimethoxy-2-nitriminoimidazolidine mixed with 1 part of 37% aqueous formaldehyde were treated with 4 parts of difluoramine and 7.2 parts of 96% sulphuric acid as described in Example 1 and 0.04 part (7% of theory) of a crystalline solid product were obtained. The solid melted at 145–147° C. and was shown by elemental analysis to contain 22.9% carbon, 3.5% hydrogen, 17.3% fluorine and 32.4% nitrogen. It had an identical infra-red spectrum to the 4-difluoramino-5-methoxy-2-nitriminoimidazolidine produced in Example 1.

Example 3

0.547 part of 4,5-diethoxy-2-nitriminoimidazolidine were treated under reflux with 4 parts of difluoramine and 9 parts of 80% aqueous sulphuric acid as described in Example 1. 0.079 part (14% of theory) of a white crystalline solid product were obtained. The solid product melted at 173° C. with decomposition, and was identified as 4-difluoramino-5-ethoxy-2-nitriminoimidazolidine. The solid product was found to contain 26.1% carbon, 4.0% hydrogen, 17.0% fluorine, 30.4% nitrogen and 20.1% ethoxy groups, 4-difluoroamino-5-ethoxy-2-nitriminoimidazolidine, $C_5H_9F_2N_5O_3$, requires 26.7% carbon, 4.0% hydrogen, 16.9% fluorine, 31.1% nitrogen and 20.0% ethoxy groups.

The infra-red spectrum of the product showed strong absorptions at 2.95 and 3.1μ, attributable to NH, at 6.15μ, attributable to −N.NO₂, at 10.3μ, attributable to NF₂ and also at 6.5, 7.9, 8.15, 9.4 and 11.5μ. Weaker absorptions were also shown at 7.45, 7.6, 8.7, 8.9, 9.1, 10.15, 11.2, 12.25, 12.8 and 13.35µ.

What we claim is:

1. A compound of the formula

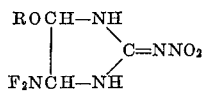

wherein R represents a $C_1$ to $C_2$ alkyl group.

2. 4-difluoramino-5-methoxy-2-nitriminoimidazolidine.

3. 4-difluoramino-5-ethoxy-2-nitriminoimidazolidine.

4. A process for the preparation of a difluoraminated derivative of alkoxy-substituted 2-nitriminoimidazolidine which comprises reacting 4,5-dialkoxy-2-nitriminoimidazolidine with difluoramine in an inert atmosphere in the presence of strong sulphuric acid.

5. A process as defined in claim 4 wherein 4,5-dimethoxy-2-nitriminoimidazolidine or 4,5-diethoxy-2-nitriminoimidazolidine is reacted with difluoramine.

6. A process as defined in claim 4 wherein the sulphuric acid is used in the presence of aqueous formaldehyde.

7. A process as defined in claim 4 wherein the reaction is carried out under conditions of difluoramine reflux.

8. A process as defined in claim 5 wherein the reaction is carried out under conditions of difluoramine reflux.

9. A process as defined in claim 6 wherein the reaction is carried out under conditions of difluoramine reflux.

References Cited

UNITED STATES PATENTS 3,342,861  9/1967  Freeman et al. _____ 26—561
3,375,259  3/1968  Gibson et al. _____ 260—309.7

LELAND A. SEBASTIAN, *Primary Examiner.*

U.S. Cl. X.R.

149—109